May 21, 1968
J. T. SPENCER
3,384,492
COFFEE BAG
Filed May 5, 1965
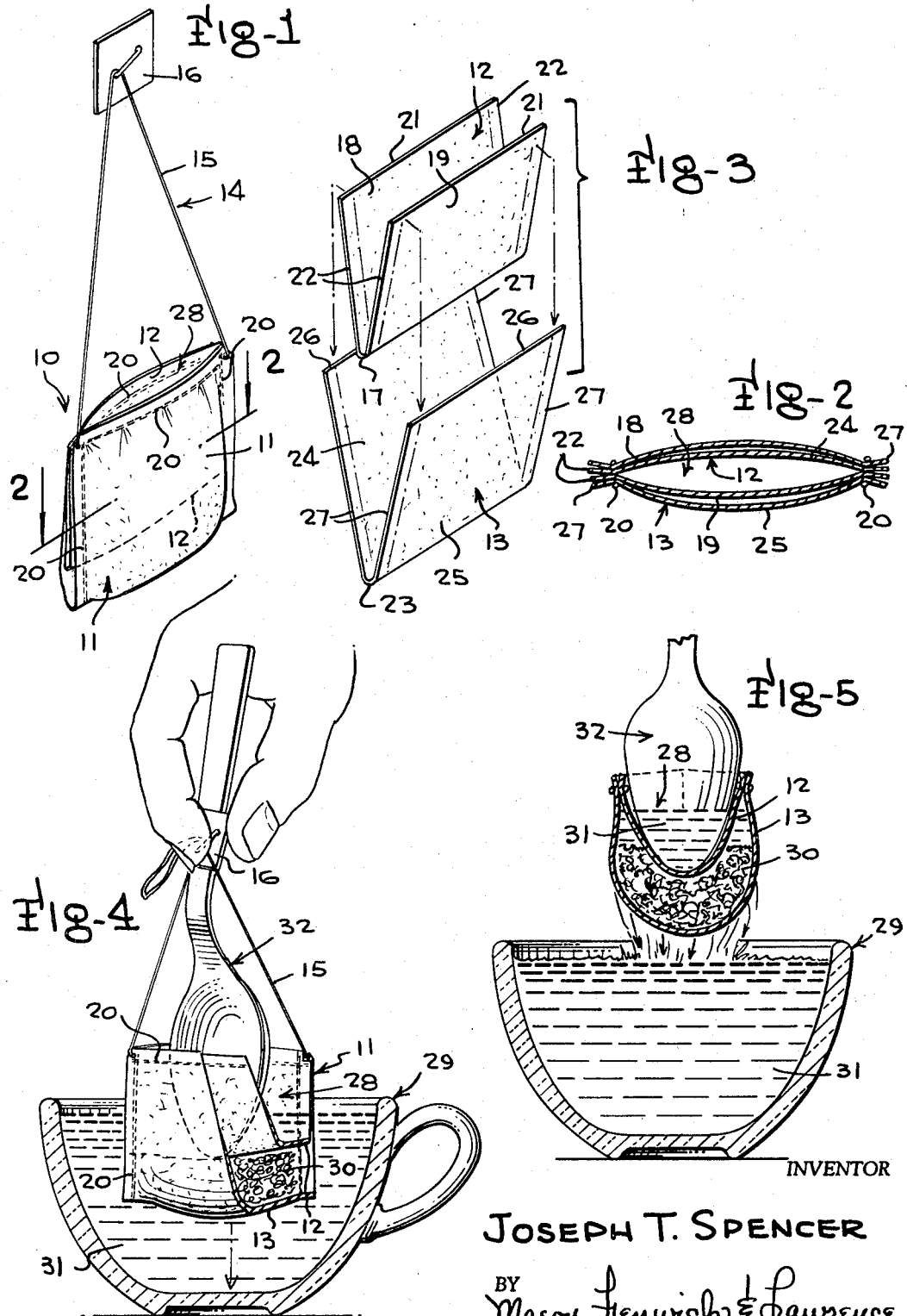
INVENTOR
JOSEPH T. SPENCER
BY Mason, Fenwick & Lawrence
ATTORNEYS United States Patent Office 3,384,492
Patented May 21, 1968

3,384,492
COFFEE BAG
Joseph T. Spencer, Mount Morris, Mich., assignor of twenty-five percent to R. Duncan Tremaine, Flint, Mich.
Filed May 5, 1965, Ser. No. 453,455
4 Claims. (Cl. 99—77.1)

ABSTRACT OF THE DISCLOSURE

A disposable beverage brewing package having a brewing granule containing outer bag into which an inwardly extending inner bag extends from the mouth of the outer bag so that a spoon can be inserted into the inner bag enabling vigorous movement of the bag in a brewing liquid and also enabling the lifting of the bag from the liquid so that brewing liquid in the inner bag drains through the brewing granules to accelerate the beverage brewing time.

---

While the beverage maker of this invention has been developed primarily for making coffee, it will, of course, be apparent from a consideration of the following disclosure, that it may be used for solids other than ground coffee for the making of any beverage desired that is adaptable to the disclosed invention.

Generally coffee is made by one of two basic methods. The first of these methods is where water, which is normally heated to a temperature approaching that of the boiling point, is released over a charge of granulated coffee in an appliance of well known design. This release of water over the granulated coffee is so released that it flows completely through the granules and extracts the aroma and flavor therefrom. Such processes are normally known as percolation or dripping. It is readily apparent that such processes involve the handling of the resultant wet grounds after the coffee is made, and one must provide the various appliances in which to brew the coffee. However, such a method is highly impractical when the individual does not have ready access to the appliance or when the individual wishes to make merely one or two cups of coffee.

The second broad concept of brewing coffee is by what is known as "instant coffee." Broadly speaking, instant coffee is manufactured by first brewing the coffee at the place of manufacture and then dehydrating it thereby leaving very small particles of the coffee concentrate which is then gathered and packaged. As is well known, the individual only has to add this coffee concentrate to hot water to brew his coffee. To a serious coffee drinker, however, the use of instant coffee is an extremely poor substitute for that which can be made with fresh grounds. Instant coffee is devoid of the good aroma and taste which may be obtained by the percolation or dripping method.

Heretofore, there has been available no device by which small individual portions of a beverage, and specifically that of coffee, can be made which is either the same in taste as the coffee made by the conventional apparatus, or which is not readily discernible therefrom. Hence, in order to fulfill the desires of those who insist on a beverage made from ground coffee, and who wish to be able to make it in small individual portions or amounts sufficient for a small number of individual portions this invention has been developed to provide a beverage maker or coffee bag which, in addition to being very compact in size, is disposable after a single use.

Therefore, it is the prime object of this invention to provide a disposable coffee bag that is low in cost and permits maximum coffee flavor to be extracted during the brewing process.

It is another object of this invention to provide an improved method of brewing coffee in small individual portions without the need of large scale apparatus for brewing same.

It is also an object of this invention to provide a novel disposable coffee bag containing a premeasured amount of coffee which is relatively economical and each to manufacture and which is simple and highly effective in operation.

Another object of this invention is to provide a coffee package of the type described herein which is filled with a suitable amount of coffee during manufacture, said amount corresponding to the number of cups of coffee intended to be brewed in the package.

A still further object of this invention is the provision of an improved coffee bag which provides means for forcing the brewing liquid through and around the coffee granules within the bag so that the flavor and aroma is extracted from the coffee granules; said means for forcing the brewing liquid through the coffee granules comprising a liquid reservoir which forces the liquid to flow by gravity through the granules.

Other objects, advantages and capabilities of the invention will become apparent from the following description, taken in conjunction with the accompanying drawings showing only a preferred embodiment of the invention.

In the drawings:

FIGURE 1 is a perspective view showing the coffee bag of the present invention;

FIGURE 2 is a horizontal section view taken along lines 2—2 of FIGURE 1;

FIGURE 3 is an exploded perspective view of the components of the coffee bag of the present invention;

FIGURE 4 is a perspective view partially broken away showing the method of using the coffee bag of the present invention with relation to the brewing liquid; and FIGURE 5 is a section view similar to that shown in FIGURE 4 showing the coffee bag being raised out of the brewing liquid with the brewing liquid filling the reservoir and flowing by gravity through the coffee granules.

Generally the invention comprises a disposable coffee bag which is formed from what is commercially known as "tasteless" paper into an envelope in which is measured a predetermined amount of coffee. More specifically the envelope is formed of an inner bag and an outer bag which are generally joined about their peripheral edges. It is proposed that the inner bag have a somewhat lesser depth than that of the outer bag so that when the bags are joined together, there is a space left between the inner bag and the outer bag for the desired charge of coffee. Once the charge of coffee has been placed in a required manner in the bag of the instant invention, the peripheral edges are joined in a normal manner such as by stitching or, more preferably, by heat sealing. In the present invention the coffee bag is joined entirely up the side peripheral edges so that no open space is left therein. About the upper peripheral edges it is so joined as to provide a fluid reservoir completely enclosed by the inner and outer bags. The fluid reservoir is left open at the top thereof so that the brewing liquid may be easily received therein.

The pores of the paper making up the bag paper are, of course, smaller than the size of the coffee particles so as to retain the coffee within the bag. The paper for the envelope is preferably heat sealable to facilitate the forming operation. Preferably the paper is a sheet comprised of a base portion containing long substantially unhydrated fibres which are relatively inert and a top portion of thermoplastic fibers which are activatable by heat and pressure so as to permit bonding of the paper upon placement between heat sealing jaws of the sealing apparatus. Since there is a tendency for natural fibres to absorb some of the coffee oils man-made fibres such as rayon, nylon and polyglycol terephthalate are most desirably employed as substantially the entire nonthermoplastic or inert fibre component of the base portion are bonded together by a small percentage of a highly beaten natural fibre or flock or other bonding agents such as the fibrids, and a water-insoluble sodium carboxymethylcellulose.

Referring now to the drawings wherein like reference numerals correspond to similar items throughout the specification, the beverage bag arrangement of the present invention is indicated by the numeral 10. The beverage bag 10 is comprised of a bag construction 11 having an inner bag 12 and an outer bag 13. As can be seen in FIGURE 1 the bag construction has attached thereto the holding means 14 which comprises a string 15 having its free ends tied to the opposite sides of the bag construction 11. At the midpoint of the string 15 there is a finger tab 16 which is commonly used to provide means to hold onto the string 15 when using the bag.

In FIGURE 3 the bag construction 11 is more readily seen wherein the inner bag 12 is generally an elongated piece of the porous paper and is folded about its midportion, indicated by numeral 17, to form a folded member in which the two flaps thereof are indicated by numerals 18, 19 are generally of equal size. The inner bag has an upper peripheral edge 21 on each of the folded flaps 18 and 19. In addition, the folded flaps, and of course the inner bag itself, have side peripheral edges denoted by numeral 22.

The outer bag is a member similar to the inner bag; however, when it is folded about its midpoint 23, the folded flaps 24, 25 are of somewhat greater length than the corresponding flaps of the inner bag. Therefore, it can be seen that the depth of the inner bag will be somewhat less than that of the outer bag. This provision is made so that a charge of coffee 30, or other brewing material may be placed within the outer bag and enclosed therein by the inner bag being sewed or joined to the outer bag as shown by numeral 20. The outer bag also comprises upper peripheral edges 26 and side peripheral edges 27.

As is evident when the inner and outer bags are joined together, the entire side peripheral edges 22 and 27 of the bags are joined together; however, the upper peripheral edges are joined together so as to provide a reservoir 28 which permits the brewing liquid to flow therein and then be forced by gravity to flow through and around the brewing granules to extract the complete flavor and aroma therefrom.

FIGURE 4 shows the preferred manner in which the coffee bag of the present invention may be used. First there must be a provision for a suitable cup or other container indicated by the numeral 29 in which the brewing liquid 31 is contained. It should be noted that with the bag of the instant invention, the brewing liquid does not necessarily need to be at a boiling point and because of the reservoir and the manner in which the liquid is forced through the granulated coffee, cold water may be used, although the brewing time would be considerably lengthened. A person using the bag of this invention would preferably take a spoon 32 or other suitable implement and place it within the reservoir 28 in a manner to maintain the reservoir at its greatest liquid holding capacity. To do this the spoon would normally be held perpendicular to a plane passing through the seams of the side peripheral edges of the bag. Once the spoon is placed within the reservoir, the finger tab would be grasped along with the spoon to maintain the bag snugly against the spoon. At this time, the bag would then be inserted into the brewing liquid 31 until it is completely submerged thereby forcing water into the reservoir 28. Once the reservoir 28 is filled, the bag 10 and the spoon 32 would then be lifted by means of string 15 from the brewing liquid. This would cause the trapped water within the reservoir to be raised along with the bag. Upon such an event occurring, the brewing liquid within the reservoir would then be gravity fed through the granulated coffee and then would exit through the bottom of the outer bag back into the brewing liquid within the cup 29. This procedure would be repeated until the desired strength of the brewed coffee is obtained according to the desires and likes of the person brewing the cup of coffee.

As seen from FIGURE 5 the present invention forces the brewing liquid over and around the granulated coffee in such a manner as to extract the flavor and aroma and coffee oils therefrom so as to brew a cup of coffee much in the same manner and having the same taste and other pleasing qualities that has heretofore been done in a much more complicated manner. It is obvious that the present bag construction may be used for other brewing materials other than coffee, and it should not be inferred that the present invention is so limited. The present invention is of great practical use and advantage when used to brew such materials such as coffee, since the coffee bean has an extremely high oil content. Because of this oil content, it is hard to have a brewing liquid take on the flavor and aroma of the coffee unless that liquid is actively forced over all portions of the granulated coffee, and as is self evident, the brewing liquid must be passed over the coffee many times to extract the desired qualities from the coffee.

The instant invention should be of great practical use to the individual who wishes to brew a single cup of coffee when he has no recourse to the more complicated brewing apparatus that is normally used. Also, it is readily apparent that the instant invention may be of great use in vending machines wherein the only liquid ingredient needed would be the brewing liquid itself. The present invention could be of great use in restaurants wherein the customer would be supplied with a cup of hot brewing liquid and one of the bags of the present invention filled with the coffee of his own particular taste, and he would then be able to brew his coffee to the strength that he desires. Therefore, the invention provides means by which an individual may have a cup of coffee according to his individual desires and taste and wherein the individual has control over the brewing process himself. Of course, the principles described herein could be used in coffee bags of larger size so as to brew two or more cups of coffee at the same time.

While I have particularly shown and described one particular embodiment of the invention, it is distinctly understood that the invention is not limited thereto but that modifications may be made within the scope of the invention and such variations as are covered by the scope of the appended claims.

What is claimed is:

1. A disposable beverage-making package comprising an outer bag having a mouth portion, a charge of brewing particles within the interior of said outer bag, an inner bag of less length than said outer bag substantially concentrically received within the confines of said outer bag and having a mouth portion having an outer periphery sealingly connected to the inner periphery of the mouth portion of said outer bag so that the mouth of said inner bag remains open but said inner bag provides a barrier against the escape of said brewing particles from said outer bag through the mouth of said outer bag and a string having its ends connected to opposite sides of said mouth portions so that said package can be lifted from a brewing liquid to enable a quantity of brewing liquid within the confines of said inner bag to flow through the inner bag into contact with the brewing particles to extract solubles therefrom.

2. The invention recited in claim 1 wherein the string is of sufficient length to permit the package to be lifted from the brewing liquid.

3. The invention recited in claim 1 wherein said bags are connected by a heat seal.

4. The invention recited in claim 1 wherein said bags are also connected along respective side edges thereof.

References Cited

UNITED STATES PATENTS

| | | | |
|---|---|---|---|
| 2,918,373 | 12/1959 | Weston | 99—77.1 |
| 2,925,171 | 2/1960 | Eaton | 99—77.1 X |
| 3,175,911 | 3/1965 | Rambold | 99—77.1 |

RAYMOND N. JONES, *Primary Examiner.*

S. B. DAVIS, *Assistant Examiner.*